US012801101B2

(12) United States Patent

Sheshagiri Naik et al.

(10) Patent No.: US 12,801,101 B2
(45) Date of Patent: Nov. 17, 2026

(54) SYSTEM AND METHOD FOR MANAGING DEVICES BY MANAGING OPERATION INFORMATION COLLECTION

(71) Applicant: Dell Products L.P., Round Rock, TX (US)

(72) Inventors: Akshata Sheshagiri Naik, Leander, TX (US); Rui An, Austin, TX (US); Chandrasekhar Mugunda, Austin, TX (US)

(73) Assignee: Dell Products L.P., Round Rock, TX (US)

(*) Notice: Subject to any disclaimer, the term of this patent is extended or adjusted under 35 U.S.C. 154(b) by 895 days.

(21) Appl. No.: 18/185,571

(22) Filed: Mar. 17, 2023

(65) Prior Publication Data

US 2024/0310800 A1 Sep. 19, 2024

(51) Int. Cl.

| | |
|---|---|
| ***G06F 11/30*** | (2006.01) |
| ***G05B 15/02*** | (2006.01) |
| ***G06F 1/3287*** | (2019.01) |
| ***G06F 11/07*** | (2006.01) |

(52) U.S. Cl.

CPC ........... *G05B 15/02* (2013.01); *G06F 1/3287* (2013.01); *G06F 11/0751* (2013.01); *G06F 11/3055* (2013.01); *G05B 2219/24065* (2013.01); *G06F 11/3058* (2013.01)

(58) Field of Classification Search

None

See application file for complete search history.

(56) References Cited

U.S. PATENT DOCUMENTS

| | | | | |
|---|---|---|---|---|
| 10,437,754 | B1 | 10/2019 | Ebisuzaki | |
| 10,489,232 | B1 * | 11/2019 | BeSerra | G06F 11/0709 |
| 10,719,374 | B1 | 7/2020 | Mathur | |
| 11,870,668 | B1 | 1/2024 | Mugunda | |
| 2006/0253633 | A1 | 11/2006 | Brundridge | |
| 2008/0104453 | A1 * | 5/2008 | Mukherjee | G06F 11/0724 714/E11.026 |
| 2009/0089624 | A1 * | 4/2009 | Austen | G06F 11/0706 714/39 |

(Continued)

FOREIGN PATENT DOCUMENTS

| | | | | |
|---|---|---|---|---|
| CN | 114153689 A | * | 3/2022 | G06F 11/3055 |

OTHER PUBLICATIONS

Plesky, (REST—All You Have To Know About Representational State Transfer, plesk.com/blog, blog, Apr. 13, 2020), (Year 2020) (6 pages).

(Continued)

*Primary Examiner* — Emilio J Saavedra

(74) *Attorney, Agent, or Firm* — WOMBLE BOND DICKINSON (US) LLP

(57) ABSTRACT

Methods and systems for managing operation of data processing systems are disclosed. To manage operation of the data processing systems, information regarding the operation of management controller enhanced devices may be obtained. The information may be analyzed to identify how to modify the operation of the management controller enhanced devices to address events and/or conditions that may impact performance of computer implemented services. The type and quantity of information collected may be limited to manage overhead placed on the data processing systems.

20 Claims, 6 Drawing Sheets

(56) References Cited

U.S. PATENT DOCUMENTS

| | | | | |
|---|---|---|---|---|
| 2012/0284211 | A1 | 11/2012 | Datta | |
| 2015/0370294 | A1* | 12/2015 | Busch | G06F 1/206 713/320 |
| 2016/0034331 | A1 | 2/2016 | Na | |
| 2017/0339178 | A1 | 11/2017 | Mahaffey | |
| 2018/0139262 | A1 | 5/2018 | Li | |
| 2018/0307579 | A1 | 10/2018 | Rothchilds | |
| 2019/0017513 | A1 | 1/2019 | Hillerup | |
| 2019/0108116 | A1 | 4/2019 | Benes | |
| 2020/0021885 | A1 | 1/2020 | Li | |
| 2020/0050510 | A1* | 2/2020 | Chien | G06F 11/1428 |
| 2020/0201650 | A1* | 6/2020 | Huang | G06F 9/3861 |
| 2023/0156032 | A1 | 5/2023 | Andriani | |
| 2023/0359517 | A1* | 11/2023 | Senn | G06F 11/076 |

OTHER PUBLICATIONS

Bigelow, Stephen. "What Is Edge Computing? Everything You Need to Know." TechTarget, Dec. 8, 2021. Retrieved from <www.techtarget.com/searchdatacenter/definition/edge-computing> on Mar. 13, 2026. (20 pages).

* cited by examiner

SYSTEM AND METHOD FOR MANAGING DEVICES BY MANAGING OPERATION INFORMATION COLLECTION

FIELD

Embodiments disclosed herein relate generally to device management. More particularly, embodiments disclosed herein relate to systems and methods to manage the operation of data processing systems and hosted devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
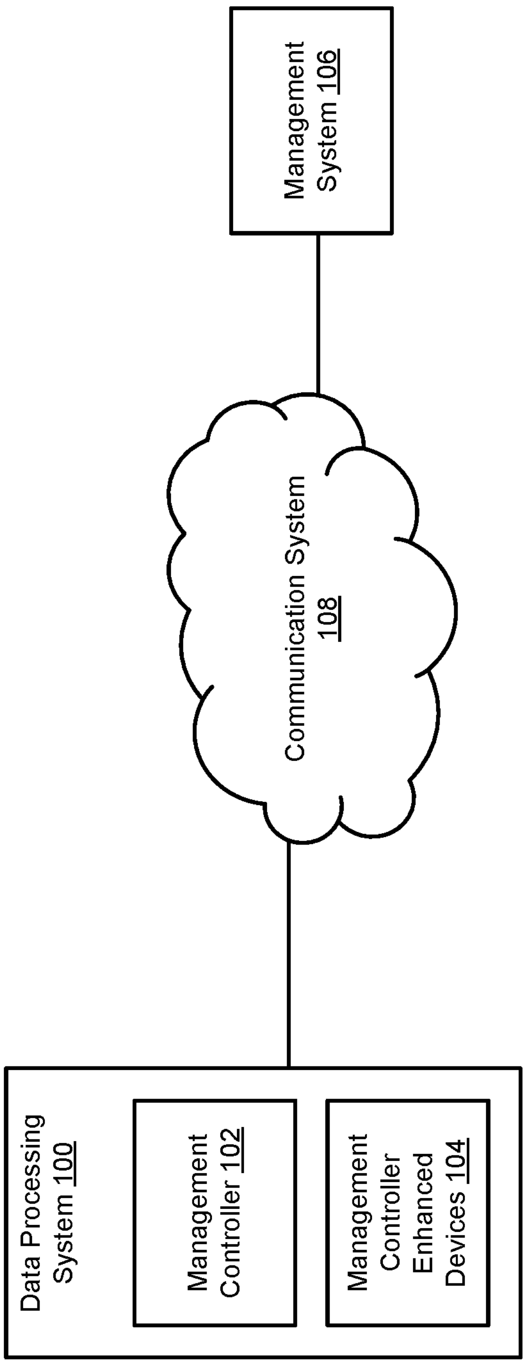
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, information regarding the operation of components of the data processing systems may be obtained and analyzed. Based on the analysis, various management operations may be performed. The management operations may change the manner in which the components operate. By changing the manner of operation, various undesired operation may be corrected to retain the operation of the data processing system within nominal ranges.

Processing the information regarding the operation of the components may limit the data processing systems from performing other types of desired functionalities. To reduce the overhead for management of the data processing systems thereby improving accessibility to desired functionalities, the data processing systems may proactively limit the type and quantity of information regarding the operation of the components that is collected. The information may be limited by specifying the types of information regarding events, conditions, etc. impacting the components of the data processing systems.

Additionally, log that may specify operation of the components for various portions of time may not be collected until certain events or conditions are identified. By limiting collection of logs until events or conditions are identified, the overhead for managing the operation of the data processing systems may be further reduced while still allowing for impairments of the operation of the components to be identified and addressed.

Once an event and/or condition are identified, performance of corresponding management operations may be initiated. The components or host data processing systems may perform any of the management operations. The specific operations, and performers of the operations, may depend on the priority level for events/conditions as well as the components that are impacted by the events/conditions. Consequently, the response to events impacting different components may be varied such that more aggressive responses may be performed when more critical components are impacted by events.

By doing so, the likelihood of successfully managing the operation of data processing systems over time may be improved. For example, by limiting the types and quantities of events, conditions, etc. upon which action may be taken, reduced quantities of information regarding the operation of components may be processed. By doing so, the overhead for management of the operation of data processing system may be reduced. Thus, embodiments disclosed here may address, among others, the technical problem of limited availability of computing resources. By reducing the quantity of resources expended for management purposes, the resulting performance of the desired functionalities of the data processing systems may be improved without adding additional hardware resources to the data processing systems. Thus, embodiments disclosed herein may provide an improved data processing system that more efficiently marshals limited computing resources.

In an embodiment, a method for managing operation of management controller enhanced devices (MCEDs) is disclosed. The method may include identifying, by a management controller of a host data processing system, an occurrence of a monitored event experienced by a MCED of the MCEDs based on a report from a guest management controller of the MCED, the MCED being hosted by the host data processing system; based on identifying the occurrence: identifying, by the management controller, a type of the monitored event; obtaining, by the management controller, a portion of telemetry data based on the type of the monitored event, the telemetry data being based on operation of the MCED associated with the monitored event; identifying, by the management controller and based at least in part on the type of the monitored event and the telemetry data, a management action set; and performing, by the management controller, the management action set to manage an impact of the monitored event.

Identifying the management action set may include identifying a priority level for the monitored event. The management action set is selected based on the priority level.

Identifying the management action set may further include identifying a component of the MCED impacted by the monitored event. The management action set may also selected based on the component of the MCED.

The priority level may be selected from a group of priority levels consisting of a low priority level, a medium priority level, and a high priority level.

In a first instance of the identifying of the management action set where the priority level is the low priority level, the management action set may include logging the telemetry data while retaining operation of the component and the host data processing system.

In a second instance of the identifying of the management action set where the priority level is the medium priority level, the management action set may include powering down the MCED.

In a third instance of the identifying of the management action set where the priority level is the high priority level, the management action set may include powering down the MCED and powering down the host data processing system.

The method may also include, prior to identifying the occurrence of the monitored event: identifying, by the management controller, a type of the MCED; identifying, by the management controller, a subset of monitorable events based on the type of the MCED; and initiating, by the management controller, active reporting for the subset of the monitorable events by the guest management controller.

The occurrence of the monitored event may be identified based on a report through the active reporting by the guest management controller, and the report being reported to a management controller of the host data processing system.

The active reporting may limit reports provided to the management controller to the subset of the monitorable events and instances of the monitorable events that exceed corresponding priority thresholds.

In an embodiment, a non-transitory media is provided. The non-transitory media may include instructions that when executed by a processor cause the computer-implemented method to be performed.

In an embodiment, a data processing system is provided. The data processing system (or a management controller hosted by the data processing system) may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other types of service that may be implemented with a computing device.

To provide the computer-implemented services, the system may include any number of data processing system 100. Data processing system 100 may provide all, or a portion, of the computer implemented services to users of data processing system 100 and/or to other devices (not shown), and/or may cooperate with other devices that provide the computer implemented services. Different data processing systems may provide similar and/or different computer implemented services.

For example, of data processing system 100 may be members of cloud environments that provide the computer implemented services. The cloud environments may include any number of devices that provide computer implemented services.

To provide the computer-implemented services, data processing system 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide one or more of the computer-implemented services, the hardware and/or software components may need to operate in predetermined manners. If the hardware and/or software components do not operate in the predetermined manners, then a data processing system may be unable to provide all, or a portion, of the computer-implemented services that it normally provides.

In general, embodiments disclosed herein may provide methods, systems, and/or devices for managing the operation of data processing system 100. To manage the operation of data processing system 100, management operations may be performed. The management operations may include (i) collect information regarding the operation of a data processing system, and/or components thereof, and (ii) modify the operation of the data processing system, and/or components hereof. By doing so, operation of data processing system 100 may be modified over time to improve the likelihood of data processing system 100 providing desired computer implemented services.

For example, the operation of data processing system 100 may be modified to (i) address undesired operation of any of its hardware or software components that if left unaddressed may negatively impact provided computer implemented services, (ii) improve efficiency of provided computer implemented services, (iii) modify the types of services provided, and/or for other reasons.

Data processing system 100 may include management controller 102 and any number of management controller enhanced devices (MCEDs) 104. Each of these components is discussed below.

MCEDs 104 may contribute to the computer implemented services provided by data processing system 100. MCEDs may, for example, provide graphics processing services, network communication services, processing offload services, and/or other types of services. To provide these services MCEDs 104 may include any hardware components such as field programmable gate arrays, digital signal processors, application specific integrated circuits, etc.

In addition to contributing to the computer implemented services, MCEDs may track and provide information regarding the operation of their various hardware and software components to other entities. For example the MCEDs may log information regarding power consumption, temperature, errors that have occurred, and/or other types of information regarding their operation.

Management controller 102 may cooperatively and/or individually manage the operation of MCEDs 104. To do so, management controller 102 may obtain information regarding the operation of the MCEDs, and use the information to identify when to perform various management actions. The management actions may cause the operation of the MCEDs and/or the data processing system 100 to update its operation.

Figure 2A:
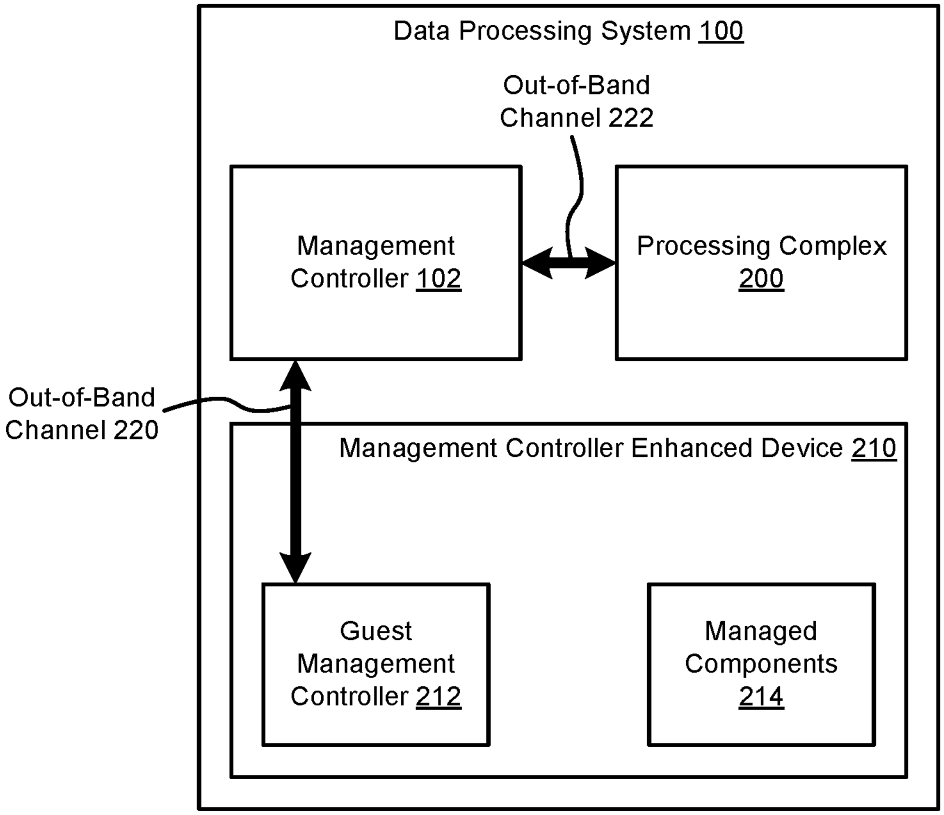
FIG. 2A shows a connectivity diagram for a data processing system in accordance with an embodiment.
Figure 2B:
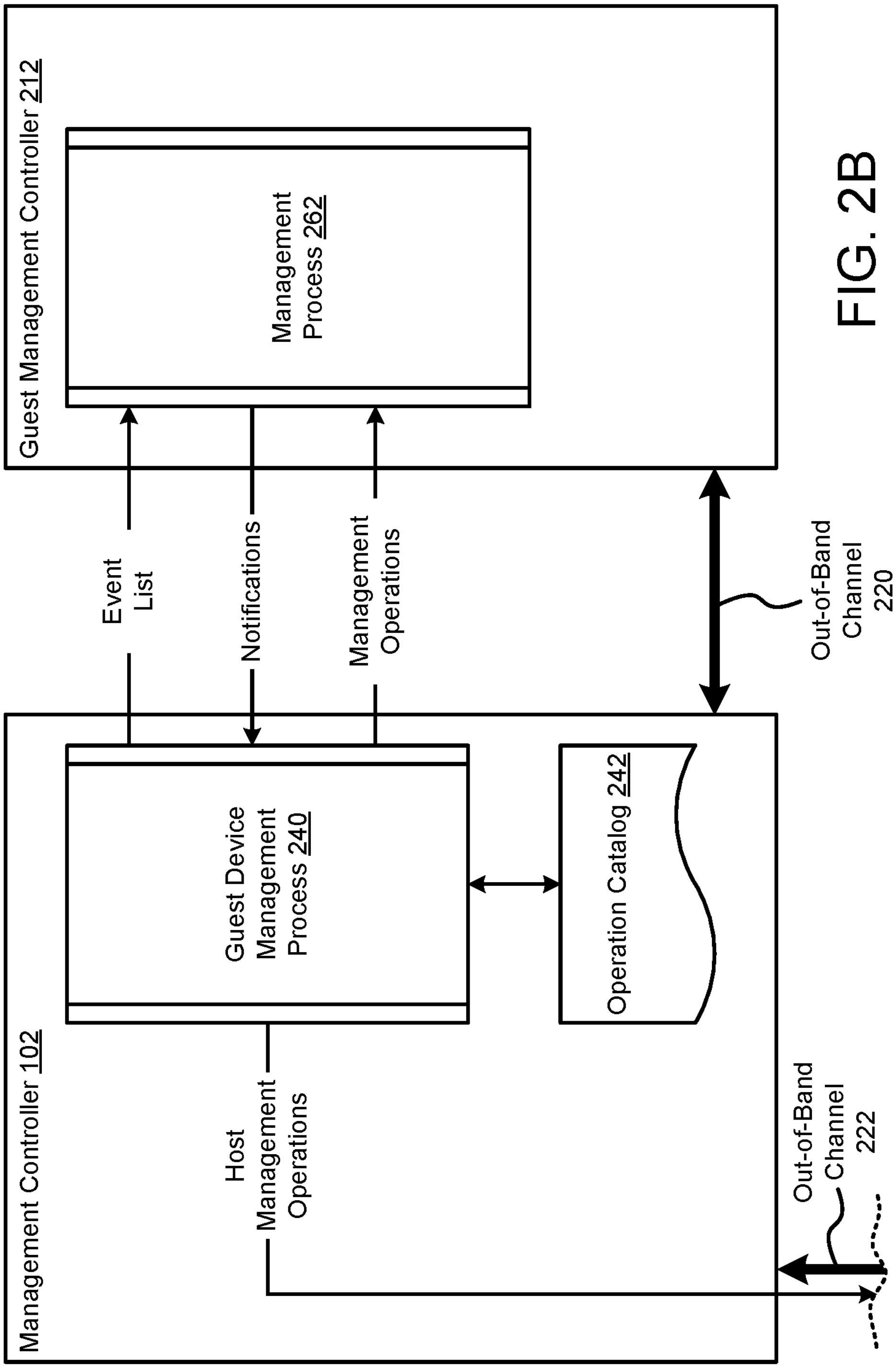
FIG. 2B shows a diagram illustrating data flows in accordance with an embodiment.

To obtain information regarding the operation of MCEDs 104, management controller 102 may implement a system through which only a limited quantity and types of information regarding the operation of MCEDs 104 is provided to management controller 102. The quantity and types of information may depend on the types of MCEDs 104, the services being provided by MCEDs 104, and/or other factors. Refer to FIGS. 2A-2B for additional details regarding monitoring of the operation of MCEDs 104.

By doing so, management controller 102 may be able to manage a larger number of MCEDs 104. For example, the quantity of information regarding the operation of the MCEDs may be such that it may be impractical to process all of it for management purposes. Additionally, some of the information may not be useful for diagnostic purposes. Consequently, by only obtaining and processing a portion of the information monitored by MCEDs 104, management controller 102 may be able to manage a larger number of MCEDs.

Management system 106 may cooperatively manage the operation of data processing system 100, and the hosted MCEDs 104. To do so, management system 106 may obtain information regarding operation of MCEDs 104 (e.g., from management controller 102) to select management operations to be performed to manage operation of the data processing system 100, and components thereof.

Figure 3A:
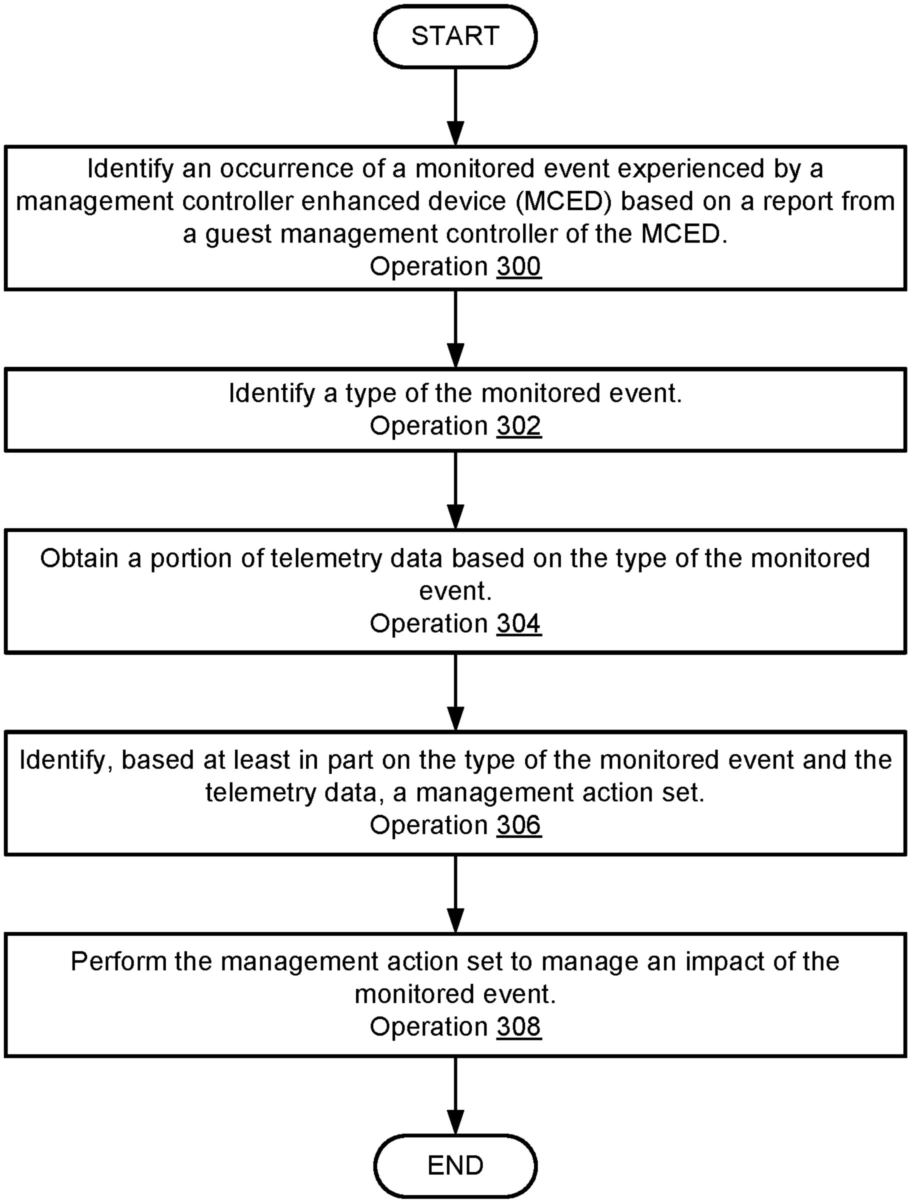
FIGS. 3A-3B show flow diagrams illustrating methods of managing operation of data processing systems in accordance with an embodiment.
Figure 3B:
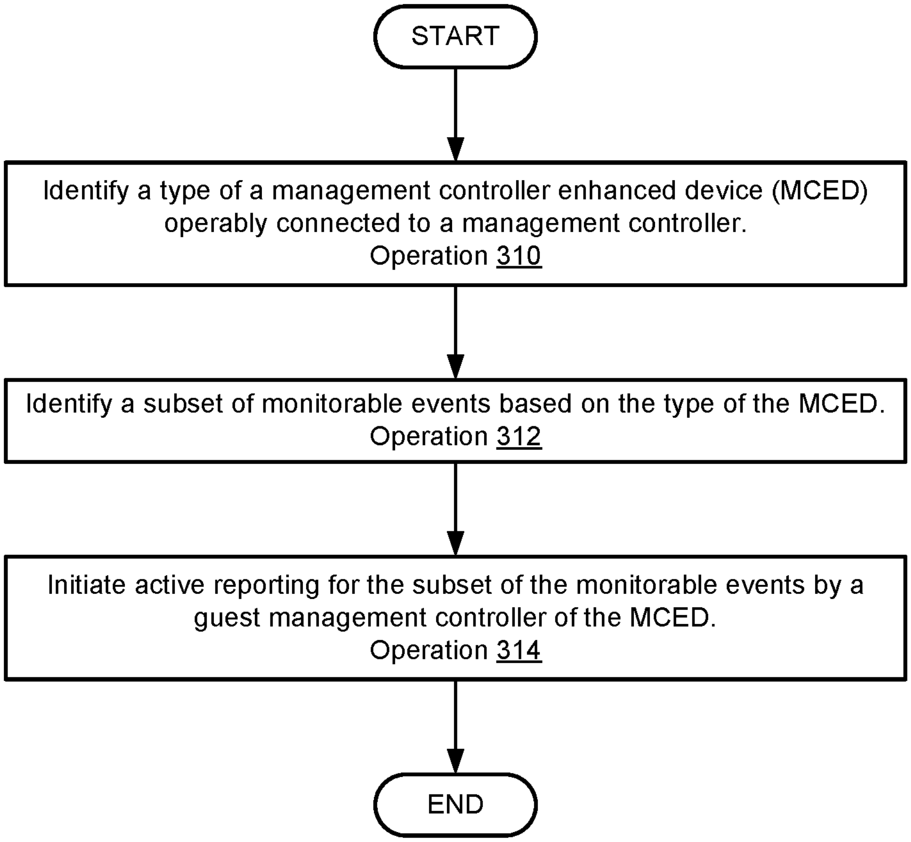

When providing their functionality, any of data processing system 100 and management system 106 may perform all, or a portion, of the methods illustrated in FIGS. 3A-3B.

Any of data processing systems 100 and/or management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Management system 106 may be implemented with multiple computing devices. The computing devices of management system 106 may cooperatively perform processes for managing the operation of data processing systems 100. The computing devices of management system 106 may perform similar and/or different functions.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, a diagram illustrating operable connections between components of a data processing system in accordance with an embodiment are shown in FIG. 2A, and a diagram illustrating data flows implemented by and data structures used by a system over time in accordance with an embodiment are shown in FIG. 2B.

Turning to FIG. 2A, a connectivity diagram illustrating connections between components of data processing system 100 in accordance with an embodiment is shown.

Data processing system 100 may include processing complex 200, management controller 102, and management controller enhanced device 210 (e.g., which may be similar to any of MCEDs 104). Each of these components is discussed below.

Processing complex 200 may include any number of processors, memory modules, and/or other hardware components that support the execution of computer code (e.g., software). Processing complex 200 may host (e.g., through execution of computer code) a management entity (e.g., an operating system), any number of applications, and/or other types of entities that may contribute to computer implemented services provided by data processing system 100.

MCED 210 may provide services utilized by processing complex 200 to provide the computer implemented services. The applications, management entity, and/or other entities hosted by processing complex 200 may request, invoke, and/or otherwise utilize the functionality provided by MCED 210.

MCED 210 may include managed components 214 (e.g., hardware components that provide services used by processing complex 200) and guest management controller 212. Guest management controller 212 may manage the operation of MCED 210 through, for example, collection of operation data, communication with management entities such as management controller 102, etc.

Management controller 102 may manage the operation of processing complex and/or MCED 210. To do so, management controller 102 may obtain information regarding the operation of MCED 210 and/or processing complex 200, and initiate management operation which may modify the operation of these components.

Processing complex 200 may be operably connected to MCED 210 via an in-band channel such as a general purposes data bus thereby facilitating use of MCED 210 by the entities hosted by processing complex 200. Management controller 102 may be operably connected to processing complex 200 via out-of-band channel 222 and to MCED 210 via out-of-band channel 220. In contrast to the general purpose data bus used to implement the in-band channel, the out-of-band channels may be implemented using data buses for management purposes. For example, the out-of-band channels may be implemented using point to point connections, may be of lower bandwidth when compared to a general data bus, etc.

The communication channels, discussed above, may be used to facilitate management of data processing system operation over time.

Turning to FIG. 2B, a first data flow diagram illustrating data flows, data processing, and/or other operations that may be performed by the system of FIG. 1 in accordance with an embodiment is shown.

As discussed above, a data processing system may host management controller 102 and any number of MCEDs. One of the MCEDs may host guest management controller 212. To facilitate management of the MCED that hosts guest management controller 212, management controller 102 may host guest device management process 240.

Guest device management process 240 may identify a type of the MCED that hosts guest management controller 212. Based on the type of the MCED, guest device management process 240 may identify types of information regarding the operation of the MCED to monitor. The type may be identified, for example, using operation catalog 242.

Operation catalog 242 may be data structure that includes information regarding management operations to be performed based on the occurrence of events, conditions, or other factors impacting the MCED. Based on the type of the MCED, operation catalog 242 may specify which types of conditions regarding the operation of the MCED that should be monitored (e.g., since occurrences of the types of the conditions may indicate that performance of corresponding management operations is to be initiated).

Guest device management process 240 may use the obtained information to establish an event list. The event list may define, for example, occurrences of events and/or other conditions which guest management controller 212 is to report to management controller 102. The event list may be provided to guest management controller 212.

A management process (e.g., 262) may consume the provided event list. Management process 262 may generally manage the operation of guest management controller 212 and the host MCED. Management process 262 may monitor for occurrences of the events, conditions, etc. specified by the event list. When such events occur, management process 262 may send corresponding notifications to guest device management process 240.

When such notifications are obtained, guest device management process 240 may identify corresponding management operations to perform (e.g., based on information included in operation catalog 242). For example, a lookup may be performed using operation catalog 242 using the events, conditions, etc. as keys. The lookups may return the management operations.

The management operations may be for execution by guest management controller 212 or a management entity hosted by a processing complex (e.g., reachable via out-of-band channel 222). Depending on the target, the management operations may be forwarded to the corresponding entity. Once received, the processing complex or guest management controller 212 may perform the operations.

The operations may include, for example, shutting down a MCED, restarting or shutting down a host data processing system, obtaining logs with information regarding the operation of the MCED (e.g., when a triggering condition, event, etc. occurred)

Once obtained, the corresponding management operations may be forwarded to management process 262 and the management entity hosted by the processing complex for respective performance.

In this manner, guest device management process 240 may only receive a limited amount of information regarding the operation of the MCED device. Consequently, management controller 102 may manage a larger number of MCEDs by only processing information likely to be indicative of a need to initiate performance of management operations.

In an embodiment, any of management controller 102 and guest management controller 212 are implemented using a hardware device including circuitry. The hardware device may be, for example, a digital signal processor, a field programmable gate array, or an application specific integrated circuit. The circuitry may be adapted to cause the hardware device to perform the functionality of management controller 102 and/or guest management controller 212 as discussed herein. Management controller 102 and/or guest management controller 212 may be implemented using other types of hardware devices without departing embodiment disclosed herein.

In an embodiment, any of management controller 102 and guest management controller 212 are implemented using a processor adapted to execute computing code stored on a persistent storage that when executed by the processor performs the functionality of management controller 102 and/or guest management controller 212 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of management controller 102 and/or guest management controller 212 include or may be operably connected to storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures such as operation catalog 242 discussed herein. Any of these data structures may be implemented using, for example, lists, tables databases, linked lists, unstructured data, and/or other types of data structures.

As discussed above, the components of FIG. 1 may perform various methods to manage operation of data processing systems. FIGS. 3A-3B illustrate methods that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing operation of a data processing system in accordance with an embodiment is shown. The method may be performed by any of data processing systems 100, management controller 102, and/or other components of the system shown in FIGS. 1-2B.

Prior to operation 300, a management controller hosted by a data processing system may initiate management for MCEDs hosted by the data processing system. Refer to FIG. 3B for additional details regarding initiating management for the MCEDs.

At operation 300, an occurrence of a monitored event experienced by a management controller of a MCED of the MCEDs may be identified based on a report from a guest management controller of the MCED. The occurrence may be identified by (i) receiving the report, and (ii) analyzing information included in the report. The report may include information regarding occurrences of events, conditions, etc. that the management controller may have already established monitoring for during initiating of management of the MCEDs.

At operation 302, a type of the monitored event is identified. The type may be identified by matching information included in the report to different types of monitorable events. The information may be included in a data structure such as, for example, a lookup table, database, etc. The information included in the report may be identifiers for the conditions, events, etc.

Performing the lookup may also return, for example, an indicator regarding a priority level for the monitored event. For example, different types of monitorable events may be assigned different priorities regarding the likely level of impact of the events. More impactful events may be assigned higher priorities. While described with respect to level of impact, other types of grading rubrics for may be used to assign priority levels to different events without departing from embodiments disclosed herein.

At operation 304, a portion of telemetry data based on the type of the monitored event is obtained. The portion of the telemetry data may be obtained by requesting it from the guest management controller (e.g., which may have access to it through monitoring of the operation of the MCED). The portion of the telemetry data may be indicated, for example, by information obtained via the lookup to identify the type of the monitorable event. For example, the lookup may specify which portion of telemetry data to obtain. The portion of telemetry data my include any type and quantity of information regarding the operation of the MCED.

At operation 306, a management action set is identified based at least in part on the type of the monitored event and the telemetry data. The action set may be identified by performing a lookup using the type of the monitored event and/or the telemetry data (or information derived from the portion of the telemetry data) as keys. The lookup may be performed using a data structure that specifies management action sets for different keys.

The management action set may also be identifying (i) a priority level for the monitored event, and/or (ii) a component of the MCED impacted by the monitored event. When the lookup is performed, these additional portions of information may also be used as keys to further discriminate different actions sets. For example, using only the type of the monitored event and the telemetry data may return multiple management action sets associated with different priority levels and/or components of the MCED. The priority level and component of the MCED may be used as keys to identify one of the management actions sets (e.g., which may each be associated with different keys).

The priority level may be part of a priority level hierarchy including a low priority level, a medium priority level, and a high priority level. The management action set associated with the low priority level key may specify various monitoring actions. In contrast, the management action set associated with the medium priority level key may specify limiting the operation of the MCED, such as shutting it down (e.g., powering it down), disabling a portion of its components, etc. Further, in contrast, the management action set associated with the high priority level key may specify limiting the operation of the MCED, such as shutting it down, disabling a portion of its components, etc. as well as limiting operation of the host data processing system such as shutting it down, disabling a portion of its components, etc.

At operation 308, the management action set is performed to manage an impact of the monitored event. The management actions set may be performed by forwarding actions of the management action set to corresponding entities for performance. For example, actions to be performed by the data processing system may be forwarded to a processing complex that hosts a data processing system management entity for performance. Similarly, actions to be performed by the MCED may be forwarded to a guest management controller of the MCED.

Forwarding the actions may initiate performance of the actions by the respective entities.

The method may end following operation 308.

Using the method illustrated in FIG. 3A, embodiments disclosed herein may provide a data processing system that may be more likely to be able to manage occurrences of events impacting MCEDs to improve the likelihood of continued operation of the data processing system.

Turning to FIG. 3B, a flow diagram illustrating a method of initiating management for a MCED in accordance with an embodiment is shown. The method may be performed by any of data processing systems 100, management controller 102, and/or other components of the system shown in FIGS. 1-2B.

At operation 310, a type of a MCED operably connected to a management controller is identified. The type of the MCED may be identified by (i) communicating with the MCED (e.g., a guest management controller of the MCED) to obtain an identifier, and (ii) using the identifier to identify the type of the MCED. For example, a lookup may be performed based on the identifier, the identifier may directly or indirectly indicate the type of the MCED, etc.

For example, when the management controller powers up or otherwise initiates operation, the management controller may enumerate operably connected MCEDs, obtain identifiers for the MCEDs, and use the identifiers to identify the type of the MCEDs.

At operation 312, a subset of monitorable events may be identified based on the type of the MCED. For example, different types of monitorable events may be stored in a data structure. Each of the different types of the monitorable events may be associated with corresponding types of MCEDs. The subset may be identified by discriminating some of the events from others based whether they are associated with the type of the MCED.

At operation 314, active reporting for the subset of the monitorable events is initiated. The active reporting may be initiated by providing information regarding the subset of the monitorable events to the guest management controller. The guest management controller may use the information to establish subscriptions, a listening list, or other entities that may trigger reports to be generated and provided to the management controller with events of the MCED match the monitorable events.

The method may end following operation 314.

Using the method illustrated in FIG. 3B, embodiments disclosed herein may improve management of MCEDs by limiting the amount of information regarding its operation that is provided to a management controller. Consequently, the management controller may process less information while still being able to identify occurrence of events that are relevant for initiating performance of management operations.

Figure 4:
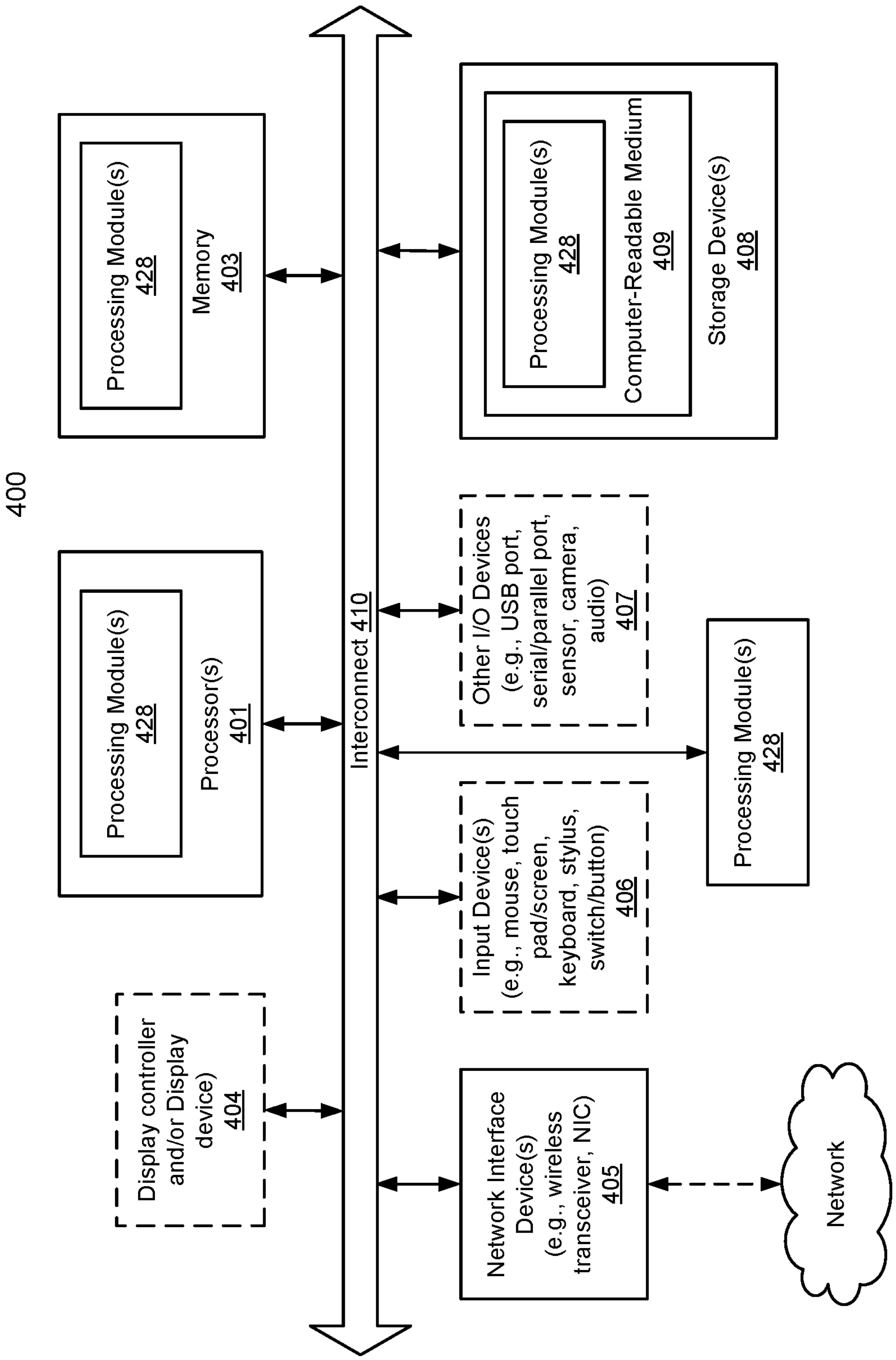
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of management controller enhanced devices (MCEDs), the method comprising:

identifying, by a management controller of a host data processing system, a type of a MCED of the MCEDs based on an operation catalog data structure stored by the management controller, wherein the MCED is hosted by the host data processing system;

identifying, by the management controller, a subset of monitorable events that are associated with the type of the MCED in the operation catalog data structure;

initiating, by the management controller, active reporting for the subset of monitorable events by a guest management controller hosted by the MCED;

identifying, by the management controller, an occurrence of a first monitored event of the subset of monitorable events experienced by the MCED based on a report from the guest management controller of the MCED as part of the active reporting;

based on identifying the occurrence:

identifying, by the management controller, a type of the first monitored event by matching information included in the report to the subset of monitorable events in the operation catalog data structure;

determining, by the management controller, a portion of telemetry data to obtain from the MCED based on the portion of the telemetry data being associated with the type of the first monitored event in the operation catalog data structure;

obtaining, by the management controller, the portion of the telemetry data based on operation of the MCED associated with the first monitored event;

identifying, by the management controller and based at least in part on the type of the first monitored event and the telemetry data, a management action set by:

identifying a priority level for the first monitored event from a group of priority levels consisting of a low priority level, a medium priority level, and a high priority level; and selecting the management action set from the operation catalog data structure based on association of the management action set with the priority level and the type of the first monitored event; and performing, by the management controller, the management action set to manage an impact of the first monitored event.

2. The method of claim 1, wherein identifying the management action set further comprises: identifying a component of the MCED impacted by the first monitored event, wherein the management action set is also selected from the operation catalog data structure based on association of the management action set with the priority level, the type of the first monitored event, and the component of the MCED.

3. The method of claim 1, wherein in a first instance of the identifying of the management action set where the priority level is the low priority level, the management action set comprises logging the telemetry data while retaining the operation of the MCED and operation of the host data processing system.

4. The method of claim 3, wherein in a second instance of the identifying of the management action set where the priority level is the medium priority level, the management action set comprises powering down the MCED.

5. The method of claim 4, wherein in a third instance of the identifying of the management action set where the priority level is the high priority level, the management action set comprises powering down the MCED and powering down the host data processing system.

6. The method of claim 1, wherein the initiating of the active reporting comprises:

identifying, by the management controller, reporting information in the operation catalog data structure associated with the type of the MCED; and providing, by the management controller, the reporting information to the guest management controller to impose limits on reports provided to the management controller, the reports being limited to the subset of monitorable events associated with the type of the MCED in the operation catalog data structure and instances of the subset of monitorable events that exceed corresponding priority thresholds.

7. The method of claim 1, wherein the operation catalog data structure associates the type of the first monitored event with a type and a quantity of data to obtain as the portion of the telemetry data with the operation of the MCED.

8. The method of claim 1, wherein the management controller is configured with access to the operation catalog data structure and the guest management controller is not configured with access to the operation catalog data structure.

9. The method of claim 8, wherein the operation catalog data structure is stored in a memory storage associated with the management controller, the memory storage includes a memory device and a persistent storage device.

10. The method of claim 9, wherein the persistent storage device is configured to provide access to the operation catalog data structure when the memory device is impacted.

11. The method of claim 10, the persistent storage device is configured to provide access to the operation catalog data structure when the memory device is impacted by a power loss event.

12. The method of claim 1, wherein the identifying of the management action set comprises, prior to identifying the priority level, obtaining a subset of action sets from the operation catalog data structure based on only the type of the first monitored event and the telemetry data, wherein the management action set is identified from the subset of action sets by the management controller.

13. The method of claim 1, wherein performing the management action set comprises forwarding a first type of action to a processing complex of a data processing system via a first out-of-band communication channel and forwarding a second type of action to the guest management controller of the MCED via a second out-of-band communication channel that is separate from the first out-of-band communication channel.

14. The method of claim 13, wherein the first type of action causes the processing complex to modify the operation of the MCED and the second type of action causes the guest management controller to modify operation of a managed component of the MCED.

15. A non-transitory machine-readable medium having instructions stored therein, which when executed by a processor, cause the processor to perform operations for managing operation of management controller enhanced devices (MCEDs), the operations comprising:

identifying, by a management controller of a host data processing system, a type of a MCED of the MCEDs based on an operation catalog data structure stored by the management controller, wherein the MCED is hosted by the host data processing system;

identifying, by the management controller, a subset of monitorable events that are associated with the type of the MCED in the operation catalog data structure;

initiating, by the management controller, active reporting for the subset of monitorable events by a guest management controller hosted by the MCED;

identifying, by the management controller, an occurrence of a first monitored event of the subset of monitorable events experienced by the MCED based on a report from the guest management controller of the MCED as part of the active reporting;

based on identifying the occurrence:

identifying, by the management controller, a type of the first monitored event by matching information included in the report to the subset of monitorable events in the operation catalog data structure;

determining, by the management controller, a portion of telemetry data to obtain from the MCED based on the portion of the telemetry data being associated with the type of the first monitored event in the operation catalog data structure;

obtaining, by the management controller, the portion of the telemetry data based on operation of the MCED associated with the first monitored event;

identifying, by the management controller and based at least in part on the type of the first monitored event and the telemetry data, a management action set by:

identifying a priority level for the first monitored event from a group of priority levels consisting of a low priority level, a medium priority level, and a high priority level; and selecting the management action set from the operation catalog data structure based on association of the management action set with the priority level and the type of the first monitored event; and performing, by the management controller, the management action set to manage an impact of the first monitored event.

16. The non-transitory machine-readable medium of claim 15, wherein identifying the management action set further comprises:

identifying a component of the MCED impacted by the first monitored event, wherein the management action set is also selected from the operation catalog data structure based on association of the management action set with the priority level, the type of the first monitored event, and the component of the MCED.

17. The non-transitory machine-readable medium of claim 15, wherein in a first instance of the identifying of the management action set where the priority level is the low priority level, the management action set comprises logging the telemetry data while retaining the operation of the MCED and operation of the host data processing system.

18. A data processing system, comprising:

a management controller enhanced device (MCED) comprising a guest management controller; and a management controller comprising:

a processor; and a memory coupled to the processor to store instructions, which when executed by the processor, cause the processor to perform operations for managing operation of management controller enhanced devices (MCEDs), the MCED being one of the MCEDs and the operations comprising:

identifying a type of the MCED based on an operation catalog data structure stored by the management controller;

identifying a subset of monitorable events that are associated with the type of the MCED in the operation catalog data structure;

initiating active reporting for the subset of monitorable events by the guest management controller of the MCED;

identifying an occurrence of a first monitored event of the subset of monitorable events experienced the MCED based on a report from the guest management controller as part of the active reporting;

based on identifying the occurrence:

identifying a type of the first monitored event by matching information included in the report to the subset of monitorable events in the operation catalog data structure;

determining, by the management controller, a portion of telemetry data to obtain from the MCED based on the portion of the telemetry data being associated with the type of the first monitored event in the operation catalog data structure;

obtaining the portion of the telemetry data based on operation of the MCED associated with the first monitored event;

identifying, based at least in part on the type of the first monitored event and the telemetry data, a management action set by:

identifying a priority level for the first monitored event from a group of priority levels consisting of a low priority level, a medium priority level, and a high priority level; and selecting the management action set from the operation catalog data structure based on association of the management action set with the priority level and the type of the first monitored event; and performing the management action set to manage an impact of the first monitored event.

19. The data processing system of claim 18, wherein identifying the management action further comprises:

identifying a component of the MCED impacted by the first monitored event, wherein the management action set is also selected based on the component of the MCED.

20. The data processing system of claim 18, wherein in a first instance of the identifying of the management action set where the priority level is the low priority level, the management action set comprises logging the telemetry data while retaining the operation of the MCED and operation of the data processing system.

* * * * *